(12) United States Patent
Domoto et al.

(10) Patent No.: US 10,657,149 B2
(45) Date of Patent: May 19, 2020

(54) INFORMATION-PROCESSING SYSTEM

(71) Applicant: Hakuhodo DY Holdings Inc., Tokyo (JP)

(72) Inventors: Ryo Domoto, Tokyo (JP); Shinya Tokuhisa, Tokyo (JP)

(73) Assignee: Hakuhodo DY Holdings Inc., Tokyo (JP)

( * ) Notice: Subject to any disclaimer, the term of this patent is extended or adjusted under 35 U.S.C. 154(b) by 410 days.

(21) Appl. No.: 15/502,643

(22) PCT Filed: Aug. 7, 2015

(86) PCT No.: PCT/JP2015/072564
§ 371 (c)(1),
(2) Date: Feb. 8, 2017

(87) PCT Pub. No.: WO2016/021726
PCT Pub. Date: Feb. 11, 2016

(65) Prior Publication Data
US 2017/0235803 A1 Aug. 17, 2017

(30) Foreign Application Priority Data

Aug. 8, 2014 (JP) ................................. 2014-162623
Jan. 6, 2015 (JP) ................................. 2015-000945

(51) Int. Cl.
*G06F 16/25* (2019.01)
*G06Q 30/02* (2012.01)
(Continued)

(52) U.S. Cl.
CPC ............ *G06F 16/258* (2019.01); *G06F 16/00* (2019.01); *G06Q 30/01* (2013.01); *G06Q 30/02* (2013.01)

(58) Field of Classification Search
CPC .................................................... G06F 16/256
See application file for complete search history.

(56) References Cited

U.S. PATENT DOCUMENTS 10,095,883 B2 * 10/2018 Antonatos ........... G06F 21/6254
2013/0198188 A1 * 8/2013 Huang ................ G06F 21/6254
707/737
2015/0304331 A1 10/2015 Nakagawa et al.

FOREIGN PATENT DOCUMENTS

JP 2014109647 A 6/2014

OTHER PUBLICATIONS

Jurczyk, Pawel, Li Xiong, and Slawomir Goryczka. "DObjects+: Enabling Privacy-Preserving Data Federation Services." 2012 IEEE 28th International Conference on Data Engineering. IEEE, 2012. (Year: 2012).*

(Continued)

*Primary Examiner* — William Spieler
(74) *Attorney, Agent, or Firm* — Meunier Carlin & Curfman LLC

(57) ABSTRACT

The information processing system comprises a storage unit and a combining unit. The combining unit is configured to store first and second databases stored by the storage unit. The first database is provided with feature data of each virtual constituent, the feature data being generated by integrating feature data of a plurality of constituents identical or similar in feature based on the feature data of each constituent of a first group. The second database is provided with feature data of each constituent of a second group. Each of the feature data provided in the first and second databases, include reference data that represents a common type of feature. The combining unit combines the first database and the second database so as to combine the feature data identical or similar in feature represented by the reference data between the first database and the second database.

18 Claims, 14 Drawing Sheets

(51) Int. Cl.
   *G06F 16/00*   (2019.01)
   *G06Q 30/00*   (2012.01)

(56) References Cited

OTHER PUBLICATIONS

Pu, Dongqiuye, Stavros Garantziotis, and Javed Mostafa. "Anonymous Record Linkage Between EPR and CDW-H: Toward Development of a Federated Genotype-Phenotype System." AMIA Summits on Translational Science Proceedings 2013 (2013): 143. (Year: 2013).*
Skripcak, Tomas, et al. "Creating a data exchange strategy for radiotherapy research: towards federated databases and anonymised public datasets." Radiotherapy and Oncology 113.3 (2014): 303-309. (Year: 2014).*
International Search Report issued in International Application No. PCT/JP2015/072564, dated Sep. 14, 2015.
Roland S., et al., "The Anatomy of Data Fusion", Worldwide Readership Research Symposium Venice, 2001, pp. 1-23.
Communication pursuant to Article 94(3) EPC, dated Jan. 17, 2019, in connection with European Application No. 1583054401-1217.
Notification of Transmittal of Copies of Translation of The International Report on Patentability issued in International Application No. PCT/JP2015/072564, dated Feb. 23, 2017, 1 page.
International Preliminary Report on Patentability issued in International Application No. PCT/JP2015/072564, dated Feb. 23, 2017, 1 page.
Written Opinion of the International Searching Authority issued in International Application No. PCT/JP2015/072564, dated Feb. 23, 2017, 5 pages.
European Search Report, dated Jan. 4, 2018, in connection with European Application No. 15830544.1-1871/3196777.
Guillermo Navarro-Arribas et al: "Information fusion in data privacy: A survey", Information Fusion, Elsevier, US, vol. 13, No. 4, Jan. 9, 2012 (Jan. 9, 2012), pp. 235-244, XP028509120, ISSN: 1566-2535, DOI: 10.1016/J.INFFUS.2012.01.001, [retrieved on Jan. 18, 2012].
Notice of Reason(s) for Rejection dated Mar. 10, 2015 in the corresponding Japanese patent application No. 2015-000945 and its English translation.
Communication pursuant to Article 94(3) EPC, dated Jan. 17, 2019, in connection with European Application No. 15830544.1.
Office Action relating to Chinese patent application No. 201580051179.6, dated Dec. 4, 2019.
Result of Consultation relating to European Application No. 15830544.1, dated Mar. 4, 2020.
Summons relating to European Application No. 15830544.1, dated Oct. 7, 2019.
Peter Van Der Putten et al. "Data Fusion Through Statistical Matching", 2002, pp. 1-13. XP055398637.
Richard S. Barr et al. "A New, Linear Programming Approach to Microdata File Merging", Compendium of Tax Research, 1978, pp. 130-155. XP055620264.

* cited by examiner

FIG. 3A

| GENDER | AGE | PURCHASE PLACE | JAN CODE | NUMBER OF PURCHASES | UNIT PRICE |
|---|---|---|---|---|---|
| ... | ... | ... | ... | ... | ... |

FIG. 3B

| GENDER | AGE | PURCHASE PLACE | PURCHASE PRICE |
|---|---|---|---|
| ... | ... | ... | ... |

FIG. 3C

| GENDER | AGE | OCCUPATION | F PAPER SUBSCRIPTION STATE | G MAGAZINE SUBSCRIPTION STATE | ... |
|---|---|---|---|---|---|
| ... | ... | ... | ... | ... | ... |

FIG. 3D

| GENDER | AGE | AREA | L SITE VISITING STATE | M SITE VISITING STATE | ... |
|---|---|---|---|---|---|
| ... | ... | ... | ... | ... | ... |

| A | NUMBER OF SAMPLES | GENDER | AGE | PURCHASE P1 | PURCHASE P2 | ... | PURCHASE Q1 | PURCHASE Q2 | ... |
|---|---|---|---|---|---|---|---|---|---|
| 00001 | 20 | ... | ... | ... | ... | ... | ... | ... | ... |
| 00002 | 23 | ... | ... | ... | ... | ... | ... | ... | ... |
| ... | ... | ... | ... | ... | ... | ... | ... | ... | ... |

155B

| B | NUMBER OF SAMPLES | GENDER | AGE | PURCHASE R1 | PURCHASE R2 | ... | PURCHASE Q1 | PURCHASE Q2 | ... |
|---|---|---|---|---|---|---|---|---|---|
| 00001 | 18 | ... | ... | ... | ... | ... | ... | ... | ... |
| ... | ... | ... | ... | ... | ... | ... | ... | ... | ... |
| 00234 | 17 | ... | ... | ... | ... | ... | ... | ... | ... |

FIG. 6C

| POST-PROCESSING DATABASE (155B) | POST-PROCESSING DATABASE (155B) | WEIGHT (NUMBER OF SAMPLES) |
|---|---|---|
| A00001 | B20056 | 5.3 |
| A00001 | B00234 | 8.2 |
| A00001 | B01123 | 6.5 |
| A00002 | B00234 | 8.8 |
| ... | ... | ... |

| HUB DATABASE (H) | POST-PROCESSING DATABASE (155B) | WEIGHT (NUMBER OF SAMPLES) | POST-PROCESSING DATABASE (155B) | WEIGHT (NUMBER OF SAMPLES) | ... |
|---|---|---|---|---|---|
| H00001 | A12345 | 5.5 | B00044 | 7.0 | ... |
| H00001 | A00456 | 6.2 | B02345 | 9.4 | ... |
| H00001 | A11004 | 9.3 | - | - | ... |

INFORMATION-PROCESSING SYSTEM

CROSS-REFERENCE TO RELATED APPLICATIONS

This international application claims the benefit of Japanese Patent Application No. 2014-162623 filed on Aug. 8, 2014 and No. 2015-000945 filed on Jan. 6, 2015 with the Japan Patent Office, and the entire disclosures of Japanese Patent Application No. 2014-162623 and No. 2015-000945 are incorporated herein by reference.

BACKGROUND

The present disclosure relates to an information-processing system that handles databases.

Analyzation of customer purchasing behavior based on sales data of goods is conventionally performed. To help commercial activities, analyzation is also performed of customer contact behavior with mass media and network contents.

By way of questionnaires and face-to-face questions, various information such as customer purchasing behavior, contact behavior with mass media/network contents, lifestyle and the like are also collected.

In recent years, each company has a large database with such data on customers. However, each company is reluctant to provide the data on customers outside the company, mainly for protection of personal information. This data, when provided outside a company holding the data, are provided with encryption, with significant removal of information that leads to customer identification, or with intentional changes so as to include errors (noise) (see Patent Document 1).

Patent Document 1: Japanese Unexamined Patent Application Publication No. 2014-109647

SUMMARY

Problems to be Solved by the Invention

As described above, provision of data on customers from data holding companies is limited from a viewpoint of protection of personal information. Data-holding companies tend to be reluctant to provide not only data on customers but also granular data, due to its high information value and concerns about disadvantages to be caused by the provision. Therefore, according to the prior art, it is difficult to effectively utilize various data existing in society.

Therefore, according to one aspect of the present disclosure, it is desirable to be able to provide a new technology relating to databases that can effectively utilize various data existing in society.

An information-processing system according to one aspect of the present disclosure comprises a storage unit configured to store a first database and a second database, and a combining unit configured to combine the first database and the second database. In one aspect of the present disclosure, an information-processing system may further comprise a generation unit configured to generate the first database.

The first database is a database including feature data of each virtual constituent relating to constituents of a first group. The feature data of each virtual constituent may be generated by integrating feature data of a plurality of constituents identical or similar in feature, based on feature data of each constituent of the first group. Feature data of a constituent represents features relating to the constituent. For example, the generation unit may be configured to statistically process feature data of a plurality of constituents for each plurality of constituents identical or similar in feature in the first group, thereby integrating the feature data of the plurality of constituents for each plurality of constituents identical or similar in feature to generate feature data of each virtual constituent.

The second database includes feature data for each constituent of the second group. The second group is the same as or different from the first group.

Each of the feature data of the first and second databases is configured to include reference data to be referred to upon the combining. The reference data represents a common type of feature between the first database and the second database.

The combining unit combines the first database and the second database so as to combine the feature data identical or similar in feature represented by the reference data between the first database and the second database.

According to the information-processing system in one aspect of the present disclosure, each plurality of feature data is integrated to generate a database including feature data for each virtual constituent. The feature data of a virtual constituent is data in which features of a plurality of constituents are mixed. For example, in a case where the first group is a group of customers, and feature data before integration is feature data of a single customer representing features of one customer, the feature data of a virtual constituent correspond to data in which features of a plurality of customers are mixed.

By converting feature data of each constituent into feature data of each virtual constituent, information granularity of feature data can be increased. Information protection for detailed information can be achieved. Therefore, according to one aspect of the present disclosure, it is possible to reduce barriers of data provision by data holders due to information protection. Therefore, according to one aspect of the present disclosure, a system may be provided that can effectively utilize various data existing in society.

The above described plurality of constituents identical or similar in feature may be a mixture of both constituents identical in feature and constituents similar in feature. The term "similarity" in the present specification may be understood as a broad term including "identical" as a subordinate concept.

Well known clustering techniques (classification techniques) may be used upon integrating feature data of a plurality of constituents identical or similar in feature. Various clustering techniques are known in the fields of language processing, pattern recognition, artificial intelligence and the like. The well known clustering techniques include hardware clustering techniques such as k-means (k-means method) and BIRCH (balanced interactive reducing and clustering using hierarchies), and software clustering techniques such as LSA (latent semantic analysis), pLSA (probabilistic latent semantic analysis), and LDA (latent dirichlet allocation method).

In one aspect of the present disclosure, the generation unit may be configured to use these well-known clustering techniques or other clustering techniques to cluster a set of feature data relating to the first group into each plurality of feature data identical or similar in feature. The generation unit may be configured to integrate for each cluster the plurality of feature data corresponding to the cluster.

In one aspect of the present disclosure, the generation unit may be configured to statistically process for each cluster the plurality of feature data corresponding to the cluster. Specifically, the generation unit may be configured to calculate for each cluster a statistic for each parameter of the plurality of feature data corresponding to the cluster. Examples of statistics include an average value, a maximum value, a minimum value, and a value representing distribution (ratio or the like). A parameter value of the feature data and its statistic may be a scalar quantity or a vector quantity. Feature data of a virtual constituent may be generated for each cluster. In one aspect of the present disclosure, the feature data of a virtual constituent may be generated to include the statistic as a parameter value representing the feature relating to the virtual constituent.

The first database may be generated by the generation unit, may be manually generated by a person, or may be generated by another method (for example, a combination of computer information processing and manual work by a person).

In one aspect of the present disclosure, the second database may also be generated in the same manner as the first database. The feature data of each constituent of the second database may be feature data of each virtual constituent. The feature data of each virtual constituent may be generated by integrating feature data of a plurality of constituents identical or similar in feature, based on feature data of each constituent of a group that is the same as or different from the first group. In one aspect of the present disclosure, the information-processing system may comprise a generation unit that generates the second database.

In one aspect of the present disclosure, the second database may be a database including the non-integrated feature data. The second database may include single source data as feature data. Each of the single source data is data based on information collected from a single information source. Single source data is feature data of a constituent that is not statisticized and modeled, and may be feature data representing features relating to a single constituent.

Each of the first and second groups described above may be a set of at least one of persons, objects, services, and places. The constituent may be an element of this set. That is, the constituent may be any one of a person, an object, a service, and a place. The objects, services, and places may be objects, services, and places related to persons.

According to one aspect of the disclosure, one of the first group and the second group may be a set of persons, and the other of the first group and the second group may be a set of at least one of objects, services, and places. Each of the first and second groups may be a set of at least one of objects, services, and places.

According to one aspect of the present disclosure, the information-processing system may comprise a plurality of generation units configured to generate databases for groups that are the same or different from each other, and a combining unit configured to combine the plurality of databases generated by the plurality of generation units. Each of the generation units may be configured to generate a database including feature data for each virtual constituent in which feature data of a plurality of constituents identical or similar in feature are integrated based on feature data of each constituent of the corresponding group.

Each of the feature data of the plurality of databases may include reference data to be referred to upon the combining. The reference data represents a common type of feature to that of the database to be combined. The combining unit may be configured to combine the plurality of databases so as to combine the feature data identical or similar in feature represented by the reference data among the plurality of databases.

According to one aspect of the present disclosure, an information-processing system may be provided that comprises: a storage unit configured to store a plurality of databases having feature data of each virtual constituent; and a combining unit configured to combine the plurality of databases stored in the storage unit. Even with this information-processing system, data existing in society may be effectively utilized.

In one aspect of the present disclosure, the combining unit may be configured to combine the plurality of databases via a specific type of database of the same group as or a different group from one of groups corresponding to the plurality of databases. The specific type of database includes single source data as feature data for each constituent of the group. The single source data includes reference data to be referred to upon combining the databases. The reference data represents a common type of feature to that of the database to be combined.

In one aspect of the present disclosure, the combining unit may be configured to combine the plurality of databases via the specific type of database, by combining the specific type of database with each of the other databases so as to combine the feature data identical or similar in feature represented by the reference data.

The single source data well represents features of the constituent since the above integration has not been done. Therefore, by combining the databases via the single source data, it is possible to more appropriately link the feature data of each virtual constituent among the databases.

In one aspect of the present disclosure, functions of the generation unit and the combining unit described above may be implemented by hardware. The function of each of these units may be implemented by a computer with a program. The functions of these units may be implemented in a distributed manner by a plurality of computers. A program for causing a computer to implement at least one function of these units may be provided to the computer. The program may be recorded on a computer readable non-transitory recording medium such as a semiconductor memory, a magnetic disk, an optical disk and the like.

According to one aspect of the present disclosure, a non-transitory computer-readable storage medium may be provided that stores a program for causing a computer to implement at least one function of the generation unit and the combining unit. According to one aspect of the present disclosure, there may be provided an information-processing system comprising a computer (processor) and a memory, the memory storing the program described above.

According to one aspect of the present disclosure, there may be provided a database combining method comprising generating or acquiring a first database and combining the first database with a second database. According to another aspect of the disclosure, there may be provided a database combining method comprising generating or acquiring a first database, generating or acquiring a second database, and combining the first database with the second database.

The database described above may be a database on customers. The database may be configured to include feature data representing at least one feature of a person, an object, a service, and a place corresponding to each customer. According to the information-processing system of one aspect of the present disclosure, data on customers may be provided to the combining unit while personal information of the customers is protected. The combining unit may generate a database including combined data on customers of different data providers.

In a case where each of the databases includes feature data representing features of each customer, the reference data may be configured as data representing a customer demographic attribute. Demographic attributes are included in data on customers held by various companies. By combining the databases based on the reference data representing the customer demographic attribute, it is possible to appropriately combine feature data of different databases. Of course, the reference data may be data representing a customer feature other than the customer demographic attribute, in addition to or in place of the customer demographic attribute.

Feature data on customers may include data representing at least one feature of customer consumption behavior, contact action to mass media, contact behavior to network contents, lifestyle, values and brand consciousness, as non-reference data other than the reference data. By combining the feature data including various information on customers as such among databases, it is possible to extract by analysis various kinds of meaningful statistical information on customers (consumers) from the combined database.

The non-reference data given here as an example may also be reference data. The reference data may be any data representing a common type of feature among databases to be directly combined from a plurality of databases.

BRIEF DESCRIPTION OF THE DRAWINGS

FIGS. 3A to 3D each is a diagram showing a structure of feature data held by a customer-related database.

FIG. 6B is a diagram illustrating a structure of post-processing databases to be combined.

FIG. 6C is a diagram showing a structure example of a combined database based on the post-processing databases.

FIG. 8B is a diagram showing a structure example of a combined database in the second embodiment.

DETAILED DESCRIPTION OF THE PREFERRED EMBODIMENTS

Hereinafter, embodiments of the present disclosure will be described with reference to the drawings.

First Embodiment

Figure 1:
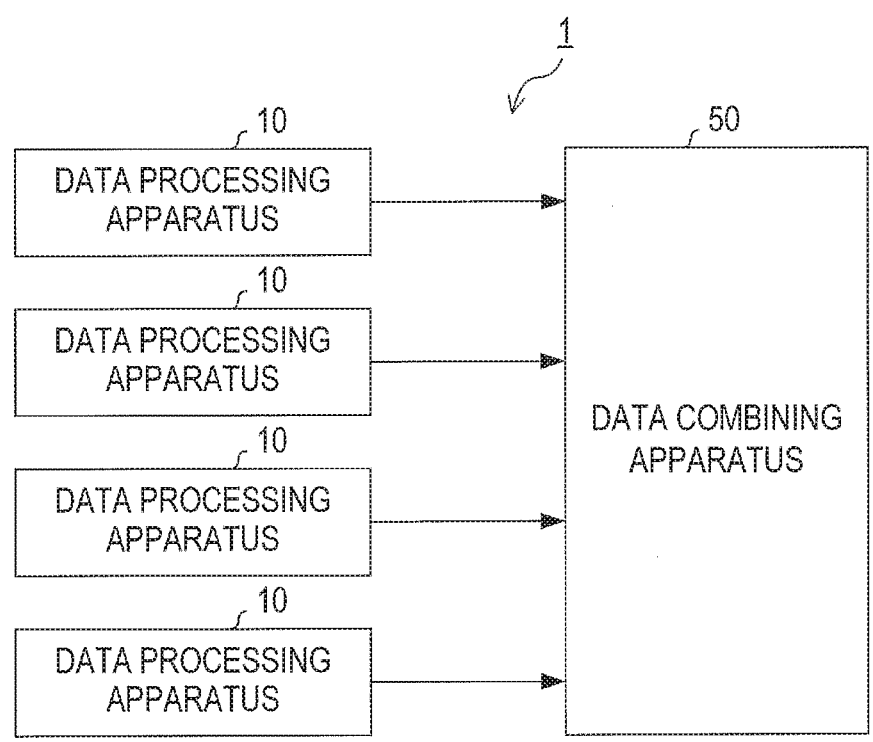
FIG. 1 is a block diagram showing a configuration of an information-processing system according to a first embodiment.

The information-processing system 1 of this embodiment shown in FIG. 1 comprises a plurality of data processing apparatuses 10 and a data combining apparatus 50. Each of the data processing apparatuses 10 processes a database 153 on customers held by a company and provides a post-processing database 155 to the data combining apparatus 50. The data processing apparatus 10 is arranged on the company side where the database 153 on customers is held.

In the following, the database 153 on customers is expressed as a customer-related database 153. A company that processes and provides the customer-related database 153 is expressed as a data provider. The customer-related database 153 includes a group of feature data on customers.

An example of the feature data may be data representing at least one of features of customer consumption behavior, contact behavior to mass media, contact behavior to network contents, lifestyle, sense of value and brand consciousness, together with the customer's ID or demographic attribute.

The customer's ID may be an identification code with which data representing the demographic attribute of the customer may be drawn from a database that stores customer information. The customer consumption behavior includes customer purchasing behavior.

For example, the feature data may be configured to have customer purchase data, together with the customer's demographic attribute. The purchase data may be data representing purchased goods and/or purchase price. In this case, the customer-related database 153 may have feature data for each customer and for each settlement.

The data processing apparatus 10 processes a plurality of feature data similar in feature into one feature data, based on the group of feature data of the customer-related database 153. The term "similar" as used herein may be understood as a broad term encompassing "identical" as a subordinate concept. The data processing apparatus 10 generates as the post-processing database 155 a database including the processed feature data as feature data of a virtual customer. In this specification, the customer-related database after processing is also expressed as a post-processing database 155. The post-processing database 155, for example, includes feature data of each virtual customer corresponding to each plurality of customers.

The post-processing database 155 is provided to the data combining apparatus 50, for example, by communication. In order to prevent database leakage, cryptographic keys and leased lines may be used for the communication. As another example, the post-processing database 155 may be stored in a portable computer-readable recording medium and provided to the data combining apparatus 50 by transportation of the recording medium. Examples of the recording medium include a semiconductor memory, an optical disk such as a CD-ROM and a DVD, and a magnetic disk such as a hard disk.

The data combining apparatus 50 combines a plurality of post-processing databases 155 provided from the respective data processing apparatuses 10 to generate a combined database 557. An example of a data provider includes, as described above, a company having the customer-related database 153 including customer purchase data as feature data.

Examples of companies holding purchase data include retailers (merchandise dealers) that operate convenience stores, supermarkets and/or department stores, companies that operate vending machines, companies that provide settlement services by electronic money, and companies providing credit card settlement services.

A retailer has a database in which purchase data for each settlement acquired through a POS system, etc. is accumulated. As a POS system, an ID-POS system that allows identification of customers is known.

In retailers, it is practiced to receive a point card from a customer upon settlement and accumulate purchase data in association with a customer ID specified from the point card, so as to build a database including purchase data for each settlement that allows identification of customers. It is also practiced to input gender and age of customers determined by a salesperson from appearance upon settlement, thereby storing purchase data for each settlement in a manner to associate demographic attributes with purchase data of customers.

The data combining apparatus 50 may build a large database, that a single company alone is unable to build, by combining a plurality of post-processing databases 155 including such purchase data of different data providers. For example, it is possible to generate a combined database 557 that allows analyzing purchasing behavior of customers (consumers) for a wide range of goods.

Figure 2A:
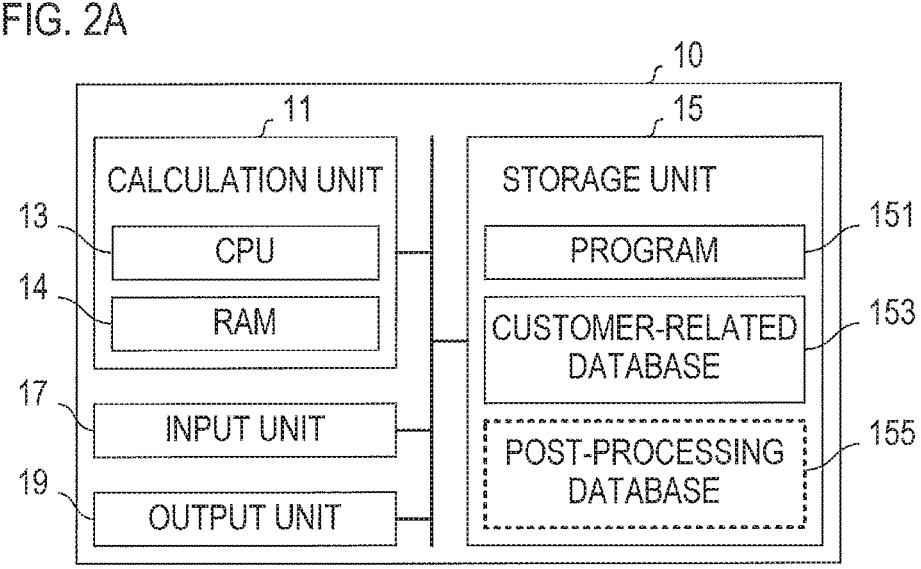
FIG. 2A is a block diagram showing a configuration of a data processing apparatus.
Figure 2B:
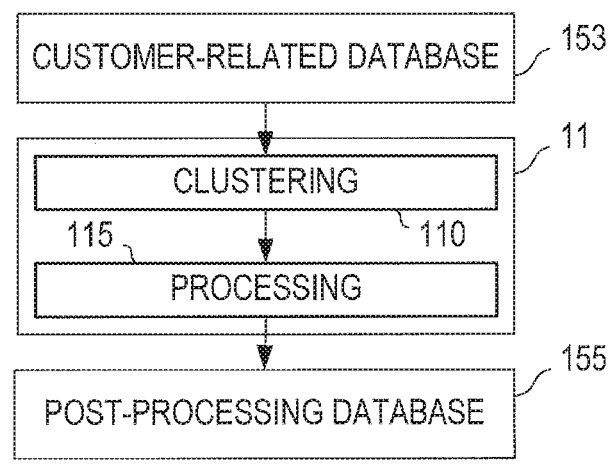
FIG. 2B is a block diagram showing processing executed by a calculation unit of the data processing apparatus.

As shown in FIG. 2A, each of the data processing apparatuses 10 comprises a calculation unit 11, a storage unit 15, an input unit 17, and an output unit 19. The calculation unit 11 comprises a CPU 13 that executes processing according to various programs 151. Further, the calculation unit 11 comprises a RAM 14 used as a work memory upon execution of the processing by the CPU 13. As shown in FIG. 2B, the calculation unit 11 functions as a clustering unit 110 and a processing unit 115, as a result of execution of the processing by the CPU 13.

The storage unit 15 stores various programs 151 including programs for causing the calculation unit 11 to function as the clustering unit 110 and the processing unit 115, and the customer-related database 153 before processing. Further, the storage unit 15 is configured to store the post-processing databases 155 generated as a result of processing the customer-related database 153.

Data that make up the customer-related database 153 are input from the input unit 17. The input unit 17 may be an interface through which data that make up the customer-related database 153 may be taken in from recording media, or an interface through which the data may be taken in from in-house systems by communication.

FIGS. 3A to 3D show examples of feature data (records) provided in the customer-related databases 153. According to the example shown in FIG. 3A, the feature data has parameters representing gender and age of customers as demographic attributes of the customers. Furthermore, the feature data has parameters indicating purchase place of goods, JAN (Japanese Article Number) code, number of purchases, and unit price of goods as parameters relating to goods purchased by the customers. JAN codes are widely used commodity codes in Japan. The customer-related databases 153 including detailed information on purchased goods as shown in FIG. 3A are held by retailers such as convenience stores and supermarkets.

According to another example shown in FIG. 3B, the feature data has parameters representing gender and age of customers as demographic attributes of the customers. Furthermore, the feature data has parameters indicating purchase place and purchase price of goods as parameters relating to the goods purchased by the customers. The customer-related databases 153 including the feature data as shown in FIG. 3B are, for example, held by credit card companies. The customer-related databases 153 held by credit card companies are superior to the customer-related databases 153 held by retailers in that they have enormous purchase data as compared with the databases held by retailers, but are complementary to the customer-related databases 153 held by retailers in that specific purchased goods are not identifiable.

According to another example shown in FIG. 3C, the feature data has parameters representing gender, age and occupation of customers as demographic attributes of the customers. Furthermore, the feature data has parameters indicating usage of a plurality of mass media (newspaper/magazine/radio/TV/movie, etc.) as parameters relating to contact state with mass media by the customers. For example, each of the parameters representing the usage indicates a value '1' when a customer uses (subscribes/views, etc.) the corresponding mass media, and shows a value '0' when not. This type of information is collected, for example, by means of questionnaires or in an interactive manner, and stored in the customer-related databases 153 as feature data. This type of customer-related databases 153 are usually held by companies relating to mass communications and not by retailers.

According to another example shown in FIG. 3D, the feature data has parameters representing gender, age, and residential area of customers as demographic attributes of the customers. Further, the feature data includes parameters representing usage of Internet sites as parameters relating to contact state with network contents by the customers. For example, each of the parameters representing the usage indicates a value '1' when the customers have used (visited) the corresponding site, and indicates a value '0' when not. This type of information, for example, is stored in a specific server through an access log generation program installed in information terminals of the customers with prior consent of the customers. Such customer-related databases 153 are usually held by IT companies, and not by retailers.

The output unit 19 is configured to transmit out the post-processing database 155 generated based on the above described customer-related database 153 from the data processing apparatus 10. For example, the output unit 19 is configured to have a communication interface through which the post-processing database 155 may be provided to the data combining apparatus 50 by communication, or an interface through which the post-processing database 155 may be output to a recording medium.

The clustering unit 110 reads a group of feature data from the customer-related database 153 before processing stored in the storage unit 15, and clusters the group of feature data into each plurality of feature data similar in feature. As the clustering technique, the known methods as described above may be employed.

An example of a simple clustering method may be a technique of arranging the respective feature data on a feature space as feature vectors, and identifying and clustering the feature data similar in feature based on cosine similarity between the feature vectors.

It is also possible to have a dimension reduction matrix act on to each of the feature vectors, so that a group of feature vectors similar in customer feature is well separated from other feature vectors on the feature space. By adjusting the dimension reduction matrix, more appropriate clustering can be achieved.

A clustering technique, like pLSA (probabilistic latent semantic analysis), is also known in which one feature data is classified into multiple clusters in a probabilistic manner. For example, 80% of one feature data may be classified into a first cluster, and the remaining 20% into a second cluster.

How to determine similarity of features and how to cluster a group of feature data may be determined by an operator of the data combining apparatus 50, in consideration of the purpose of data analysis based on the combined database 557. The operator of the data combining apparatus 50 may provide a program for operating the calculation unit 11 as the clustering unit 110 and the processing unit 115 to data providers, and acquire from the data providers the post-processing databases 155 well suited for the data analysis purpose.

In one aspect, the information-processing system 1 may generate the post-processing databases 155 in which personal information are protected by statistically processing the customer-related databases 153 held by data providers. In this case, it is preferable that clustering is performed such that each cluster includes feature data of more than the number of protectable personal information as a result of statistical processing (integration). If a cluster is generated that does not include feature data of more than the number of protectable personal information, it is conceivable to discard the feature data belonging to that cluster so as not to be processed in the processing unit 115.

The processing unit 115 performs statistical processing for integrating a plurality of feature data belonging to the same cluster for each plurality of feature data clustered by the clustering unit 110, in other words, for each cluster. Specifically, the processing unit 115 calculates a statistic for each parameter of the plurality of feature data belonging to the same cluster for each cluster, and generates feature data including these statistics as parameter values, as feature data of a virtual customer corresponding to the cluster. The processing unit 115, generates feature data of one virtual customer for each cluster, thereby generating the post-processing databases 155 having the feature data for all clusters, and writes the databases 155 in the storage unit 15.

Figure 4:
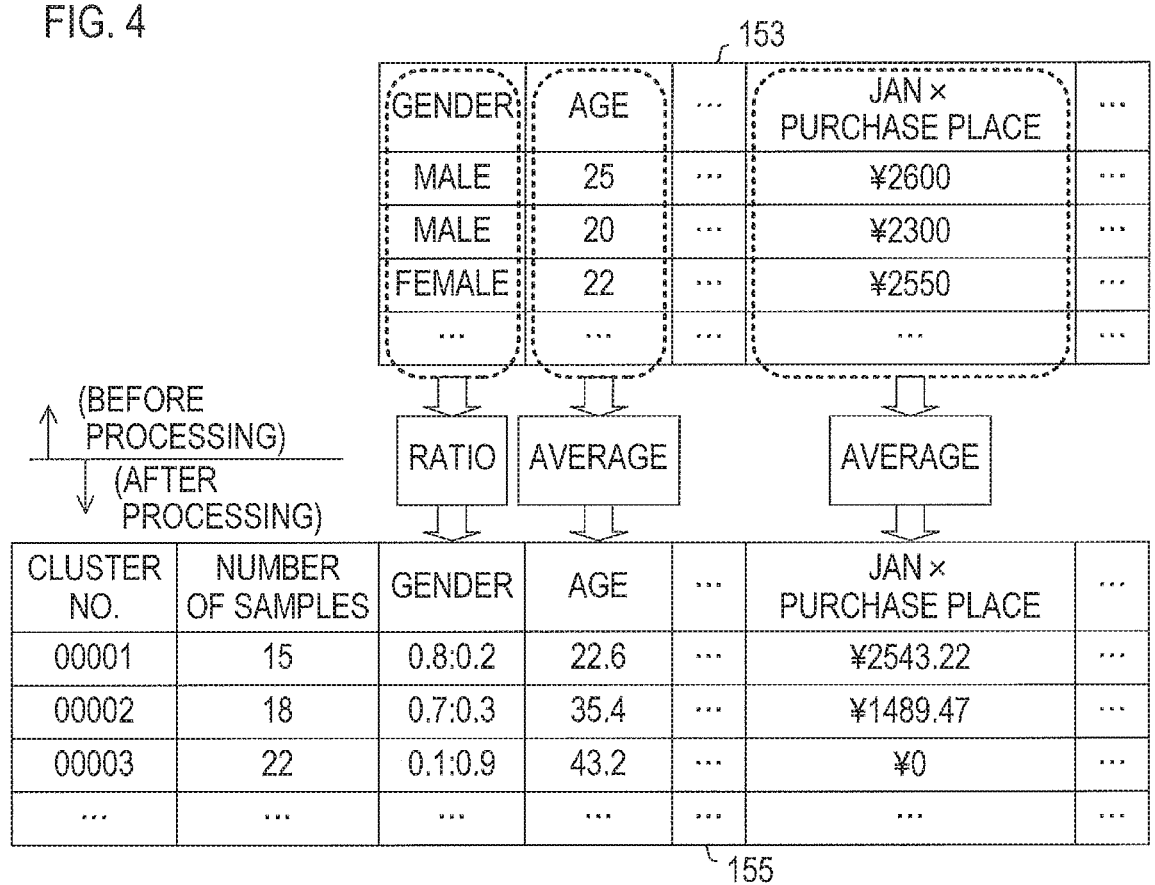
FIG. 4 is a diagram illustrating an example of a post-processing database.

According to an example shown in FIG. 4, the processing unit 115 calculates a ratio of gender indicated by the plurality of feature data in a cluster as a statistic about a parameter of gender, and writes the ratio in the feature data of a virtual customer corresponding to the cluster as a parameter value of gender. The processing unit 115 calculates an average of age represented by the plurality of feature data in the cluster as a statistic about a parameter of age, and writes the average as a parameter value of age in the feature data of the virtual customer corresponding to the cluster.

According to the example shown in an upper part of FIG. 4, each feature data before processing has a purchase parameter representing total amounts of money a customer have paid for goods of the corresponding JAN code in the corresponding purchase place, for each combination of JAN code and purchase place. In this case, the processing unit 115 may calculate an average value of the amounts represented by the plurality of feature data in a cluster for each combination of JAN code and purchase place as a statistic relating to the purchase parameter, and write the average value in the feature data of a virtual customer corresponding to the cluster.

Each feature data after processing shown in a lower part of FIG. 4 represents purchase price (average value) of goods paid by a virtual customer for each combination of JAN code and purchase place, along with the demographic attributes (gender and age) of the virtual customer.

As another example, the processing unit 115 may calculate a maximum value and a minimum value of the amounts as a value representing distribution of the purchase price, instead of the average value of the amounts. That is, the processing unit 115, for each combination of JAN code and purchase place, may write the maximum value and the minimum value of the amounts, as statistics relating to the purchasing parameter, in the feature data of the virtual customer.

According to FIG. 4, the feature data before and after processing are basically the same, except that the feature data after processing represents statistics, and that a parameter indicating the number of feature data before processing (number of samples) is added to the feature data after processing.

However, the processing unit 115 may also generate the post-processing database 155 including the feature data of each virtual customer (cluster) as shown in the lower part of FIG. 4 from the customer-related databases 153 having the feature data shown in FIG. 3A. That is, types of parameters of the feature data do not need to coincide before and after processing. One or more of the parameters before processing may be replaced during processing with other types of parameters that can be calculated therefrom.

An example has been described above in which the ratio (percentage), average, or set of maximum and minimum values are calculated as a statistic. In addition, a median, or a set of average and variance may be calculated as a statistic. What kind of statistic to calculate may be defined according to the data analysis purpose, so that significant information for analysis is not lost.

In the data processing apparatus 10, a group of feature data belonging to clusters are processed (integrated) into the feature data representing statistics for each cluster in this way, and the post-processing database 155 including the feature data after processing is output to the data combining apparatus 50.

Figure 5A:
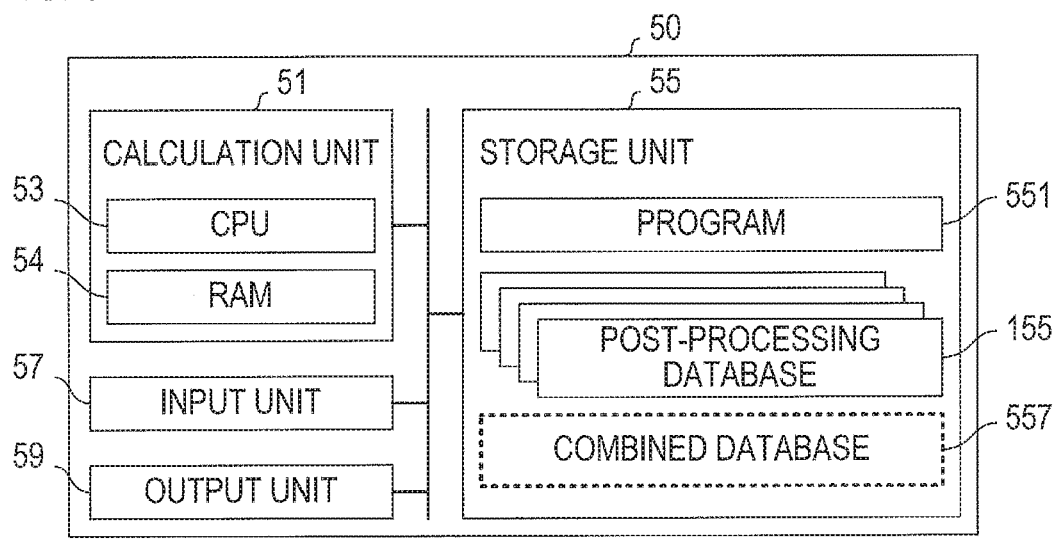
FIG. 5A is a block diagram showing a configuration of a data combining apparatus.
Figure 5B:
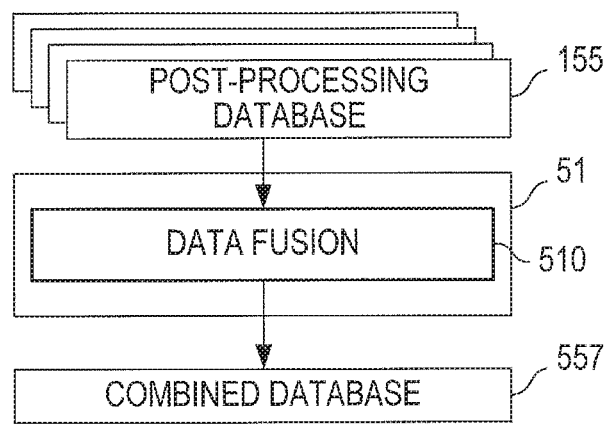
FIG. 5B is a block diagram showing processing executed by a calculation unit of the data combining apparatus.

Now, a configuration of the data combining apparatus 50 will be described with reference to FIGS. 5A and 5B. The data combining apparatus 50 comprises, as shown in FIG. 5A, a calculation unit 51, a storage unit 55, an input unit 57, and an output unit 59. The calculation unit 51 comprises a CPU 53 that performs processing according to various programs 551. The calculation unit 51 further comprises a RAM 54 which is used as a work memory upon execution of processing by the CPU 53. The calculation unit 51 functions as a data fusion processor 510 as shown in FIG. 5B by the execution of processing in the CPU 53.

The storage unit 55 stores various programs 551 including a program for operating the calculation unit 51 as the data fusion processor 510. The storage unit 55 is also configured to store the post-processing databases provided from the data processing apparatuses 10, and the combined database 557 that is generated by combining the post-processing databases 155. The post-processing databases 155 provided from the data processing apparatuses 10 are input to the data combining apparatus 50 through the input unit 57. The input unit 57 may be an interface through which the post-processing databases 155 may be input from recording media, or may be an interface through which the post-processing databases 155 transmitted from the data processing apparatuses 10 by communication may be input. The output unit 59 is used to transmit out, for example, the combined database 557 and/or data analysis results based on the combined database 557 to outside of the data combining apparatus 50.

The data fusion processing unit 510 combines multiple post-processing databases 155 stored in the storage unit 55 to generate a combined database 557. Specifically, the data fusion processing unit 510, referring to parameters in the feature data that serves as a margin, combines the post-processing databases 155 to be combined, so as to combine the feature data similar in feature represented by reference parameters among the post-processing databases 155 to be combined.

As described above, each feature data provided in the post-processing databases 155, even if different in data providers, also has parameters representing demographic attributes of customers in common. For example, the feature data has in common a parameter representing gender and a parameter representing age even among the feature data different in data providers.

The data fusion processor 510 thus, referring to the parameters held in common by the feature data of the post-processing databases 155 to be combined (hereinafter, expressed as common parameters), combines the post-processing databases 155, so as to combine the feature data similar in customer feature represented by the common parameters.

Figure 6A:
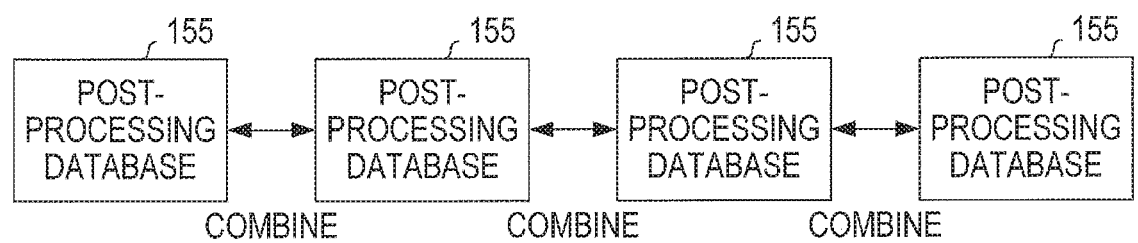
FIG. 6A is a diagram illustrating an example on how to combine post-processing databases.

Combining the post-processing databases 155, as shown in FIG. 6A, may be implemented by sequentially combining the post-processing databases 155, such as by combining a first post-processing database 155 stored in the storage unit 55 with a second post-processing database 155, the second post-processing database 155 with a third post-processing database 155, and combining the m-th post-processing database 155 with the (m+1) post-processing database 155 (m is an integer of 3 or more). As another example, the data fusion processing unit 510 may combine the post-processing databases 155 stored in the storage unit 55 in a star arrangement around a specific post-processing database 155, by combining the specific post-processing database 155 with each of the rest of the post-processing databases 155 (see FIG. 8A).

Various data fusion techniques are known. In the data fusion processing unit 510 of the present embodiment as well, the post-processing databases 155 may be combined using a known data fusion technique. According to a simple data fusion method, matching (combining) of similar feature data between two post-processing databases 155 may be performed in the following manner.

For example, as to the common parameters for evaluating the degree of similarity (e.g. age and gender), a distance (e.g. cosine distance) between feature vectors having these common parameters as elements when arranged on a feature space is calculated for all combinations of the feature data between the post-processing databases 155. By matching the feature vectors with a shortest distance therebetween, the post-processing databases 155 may be combined so as to combine the feature data similar in customer feature represented by the common parameters.

Upon evaluating the degree of similarity between two feature data by a distance on the feature space, a solution of the transportation problem may be used to perform matching of the feature data between the post-processing databases 155 so that a transportation cost is "minimum as a whole".

The combined database 557 generated by the matching as such may be configured to have stored data that links the feature data between the two post-processing databases 155.

FIG. 6C shows a configuration of the combined database 557 in a case that a post-processing database 155A shown in FIG. 6B with feature data having parameters of the number of samples, gender, age, purchase P1, P2, . . . , purchase Q1, Q2, . . . is combined with a post-processing database 155B shown in FIG. 6B with feature data having parameters of the number of samples, gender, age, purchase R1, R2, . . . , purchase Q1, Q2, . . . .

According to the post-processing databases 155A, 155B, the common parameters are gender, age, and purchase Q1, Q2, . . . . Purchase P1, P2, . . . , purchase Q1, Q2, . . . , and purchase R1, R2, . . . are, for example, purchase parameters for respective combinations of JAN code and purchase place. For example, each of the purchase parameters represents purchase price or presence or absence of purchase by customers for the corresponding combination.

For example, Purchase Pi (i is an integer of 2 or more) may be a parameter representing purchase price or presence or absence of purchase by customers in a different purchase place from that of Purchase P1, of goods having the same JAN code as that in Purchase P1. Purchase Qj, Rj (j is an integer of 1 or more) may be parameters representing purchase price or presence or absence of purchase by the customers in a purchase place corresponding to a parameter j, of goods having a different JAN code from that in Purchase Pj.

In the combined database 557 acquired by combining the post-processing databases 155A, 155B configured as such, the feature data of the post-processing database 155A and the feature data of the post-processing database 155B to be combined with each other are represented in association with their identification numbers. That is, in the combined database 557, the identification number of the feature data of the post-processing database 155B to be combined with the feature data of the post-processing database 155A is written in association with the identification number of the feature data of the post-processing database 155A.

As shown in FIG. 6C, there may be a case in which a plurality of feature data in the post-processing database 155B (B20056, B00234, B01123) are associated with one of the feature data in the post-processing database 155A (A00001).

Each feature data in the post-processing databases 155 corresponds to a plurality of feature data before processing, and the number of samples in one cluster corresponding to the plurality of feature data before processing may be different from other clusters. In this case, it is assumed that each feature data is present in an amount corresponding to the number of samples, the feature data most similar in customer feature may be combined by the same number of samples, and the feature data of the number of the remaining samples may then be combined with the second most similar feature data by the same number of samples.

In FIG. 6C, a record showing "A00001, B20056, 5.3" indicates that the feature data having an identification number A00001 of the post-processing database 155A and the feature data having an identification number B20056 of the post-processing database 155B are combined with each other by the number of samples of 5.3. Similarly, the next record indicates that the feature data having the identification number A00001 of the post-processing database 155A and the feature data having an identification number B00234 of the post-processing database 155B are combined with each other by the number of samples of 8.2. Furthermore, the next record indicates that the feature data having the identification number A00001 of the post-processing database 155A and the feature data having an identification number B01123 of the post-processing database 155B are combined with each other by the number of samples of 6.5. The feature data having the identification number A00001 of the post-processing database 155A is generated based on a cluster having the number of samples of 20. The feature data having the identification number A00001 of the post-processing database 155A is allocated to and combined with the feature data having the identification number B20056, identification number B00234, and the identification number B01123 of the post-processing database 155B.

In the combined database 557 configured as such, the post-processing databases 155 are combined with each other, and the combined database 557 and the post-processing databases 155 build up one large database. According to the example shown in FIGS. 6B and 6C, the post-processing database 155A without information about Purchase R1, R2, . . . and the post-processing database 155B without information about Purchase P1, P2, . . . are combined to build up a large database in which information of Purchase P1, P2, . . . , Purchase Q1, Q2, . . . , and Purchase R1, R2, . . . are linked. Thus, it becomes possible to analyze, for example, what kind of trend the customers who buy Purchase P1, P2, . . . show toward Purchase R1, R2, . . . .

Figure 7:
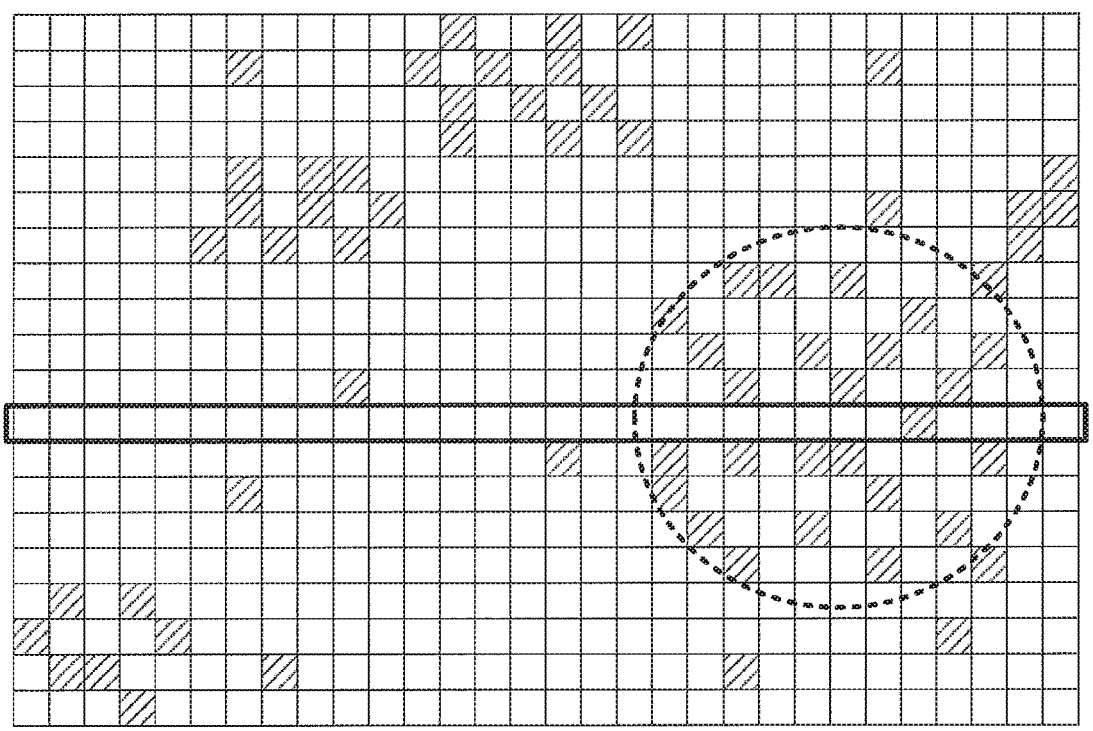
FIG. 7 is a diagram illustrating an analysis example of a combined database.

FIG. 7 is a diagram in which a block for each combination of JAN code and purchase place is arranged in a horizontal direction, and an array of the block is disposed for each virtual customer in a longitudinal direction. Hatched blocks indicate that the corresponding virtual customer has purchased goods corresponding to the JAN code at the corresponding purchase place. Unhatched blocks indicate that the corresponding virtual customer has not purchased goods corresponding to the JAN code at the corresponding purchase place.

According to FIG. 7, the hatched blocks are concentrated in a region shown by a broken line. This concentration shows that there are purchasers for the combination of JAN code and purchase place in the region. Therefore, when advertisement of the corresponding goods is given to the customers corresponding to the unhatched blocks in this region, the effect of the advertisement is significantly demonstrated. For example, virtual customers enclosed in a thick line hardly exhibit purchasing behavior in the region shown in the broken line, but correspond to purchasers based on statistics. Therefore, when advertisement of the corresponding goods is given to the corresponding customers, significant effect of the advertisement is expected.

If such data analysis is performed based on conventional data on customers, there is a possibility that information about privacy of the customers are identified in detail in an analyzing process. In contrast, according to this embodiment, data of each row shown in FIG. 6B and FIG. 7 are data on virtual customers that is statistically generated. According to this embodiment, since the above-mentioned data analysis is performed based on statistically generated data, it is possible to acquire useful information for commercial activities by the data analysis while the problem as above in the prior art is suppressed.

The information-processing system 1 of the present embodiment has been described in the above. According to this embodiment, the data processing apparatus 10 processes the customer-related databases 153, and provides the post-processing databases 155 to the data combining apparatus 50. Then, the data combining apparatus 50 combines the plurality of post-processing databases 155 generated by the data processing apparatus 10.

Based on a group of feature data of the customer-related databases 153 before processing, the calculation unit 11 of the data processing apparatus 10 clusters the group of feature data into each plurality of feature data similar in feature. Further, the calculation unit 11 statistically processes a plurality of feature data corresponding to each cluster and integrates the plurality of feature data for each cluster. Accordingly, feature data of each virtual customer corresponding to a plurality customers similar in feature is generated. In particular, the calculation unit 11 (processing unit 115) calculates a statistic for each parameter of the plurality of feature data belonging to a cluster for each cluster. Feature data of each virtual customer is generated to include the statistic as a parameter value. The calculation unit 11 (processing unit 115) generates a database including feature data of each virtual customer in which a plurality of feature data are integrated as such, as the post-processing database 155.

Each of the feature data in the post-processing database 155 includes reference data to be referred to upon combining the post-processing databases 155. The reference data represents a common type of feature to that of the post-processing database 155 to be combined. The reference data in the above embodiment represents gender and age of customers as demographic attributes of the customers.

The calculation unit 51 of the data combining apparatus 50 combines the plurality of post-processing databases 155 so as to combine the feature data similar in feature represented by the reference data among the post-processing databases 155.

That is, according to the information-processing system 1, the data processing apparatus 10 statistically processes and integrates the feature data of the plurality of customers, and generates the post-processing database 155 including feature data of each virtual customer. For example, if the feature data before being statistically processed is data of a single customer representing features of one customer, operation of the data processing apparatus 10 converts the feature data from a single customer data to a virtual customer data in which features of a plurality of customers are mixed.

Therefore, the data providers can convert the customer-related databases 153 to the post-processing databases 155 in which personal information of customers are protected, using the data processing apparatus 10, and provide data on customers to the data combining apparatus 50 while the personal information is protected.

Thereby, an operator of the data combining apparatus 50 can acquire customer-related databases from companies that had been reluctant to provide the customer-related databases 153 from a viewpoint of information protection, as the post-processing databases 155. The data combining apparatus 50 can generate a database that combines data of various customers from different data sources.

As a result, the information-processing system 1 can build, as the combined database 557, a database which integrates data on various customers dispersed in society. The information-processing system 1 can effectively utilize the data on various customers, and perform significant data analysis, based on the database.

The common parameters among the post-processing databases 155 (reference data upon combining the databases) in the above-described embodiment are gender and age of the customers. However, the common parameters may also include other parameters. For example, the common parameters may include at least one of the customers' gender, age, occupation, area of residence, income, educational background, and family composition, as demographic attributes of the customers.

Second Embodiment

The information-processing system 1 of the second embodiment is configured to use a database including a single source data as a hub database H (see FIG. 8A), in the data combining apparatus 50. The information-processing system 1 combines each of the post-processing databases 155 provided from the data processing apparatus 10 with the hub database H, thereby combining the plurality of post-processing databases 155 via the hub database H.

The information-processing system 1 of this embodiment has the same hardware configuration as that of the first embodiment. The information-processing system 1 of this embodiment is different from that of the first embodiment in that the storage unit 55 of the data combining apparatus 50 has the hub database H, in addition to the post-processing databases 155 provided from the data processing apparatus 10. In addition to this respect, the information-processing system 1 of this embodiment only differs from that of the first embodiment in processing operations of the data fusion processing unit 510. Therefore, in the following, a description of configuration similar to that the first embodiment will be omitted as required.

Single source data that makes up the hub database H is acquired, for example, from a consumer survey "HABIT (registered trademark)" conducted by Hakuhodo Co., Ltd. HABIT collects a variety of information about lifestyle (living consciousness and attitudes), values and brand awareness from each collaborator of the survey, along with information of demographic attributes of the collaborator, by way of visit interviews and questionnaires. The single source data for each customer (collaborator) generated by HABIT represents features of the customer that do not appear in purchase data and the like.

Other examples of single source data that may be provided in the hub database H is single source data including purchase data of customers acquired from ID-POS system, and single source data that represents contact state with mass media acquired via questionnaires. In addition, the hub database H may be provided with data in which these multiple types of single source data are combined for each customer.

The single source data provided in the hub database H corresponds to feature data representing customer features, and has parameters representing common demographic attributes of the customers as common parameters to those of the post-processing databases 155.

Figure 8A:
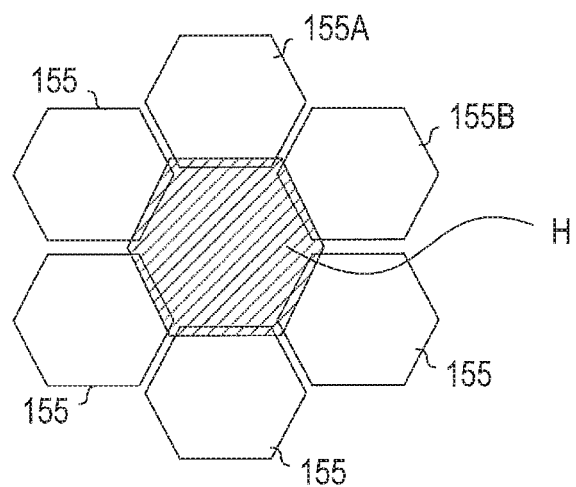
FIG. 8A is a diagram illustrating an example on how to combine post-processing databases in a second embodiment.

The data fusion processor unit 510, as shown in FIG. 8A, combines each of the post-processing databases 155 provided from the data processing apparatuses 10 with the hub database H, thereby combining the plurality of post-processing databases 155 via the hub database H. The combining method is as described above. That is, the data fusion processing unit 510 combines the hub database H with each of the post-processing databases 155 so as to combine the feature data similar in feature represented by the common parameters.

The combined database 557 represents, for example, relationship between the feature data of the hub database H and the feature data of each of the post-processing databases 155 combined thereto, in association with the identification numbers as in the above embodiment. In the combined database 557 shown in FIG. 8B, in association with an identification number of the feature data of the hub database H (H00001), identification numbers of feature data of the post-processing databases 155A, 155B (A12345, B00044) to be combined with the feature data of the hub database H are written. The number of samples shown in FIG. 8B is as described in FIG. 6C.

The single source data represents customer features well. Therefore, if the hub database H and the respective post-processing databases 155 are combined based on the hub database H having the single source data as feature data representing customer features, the feature data between the post-processing databases 155 can be further appropriately linked.

The single source data such as HABIT includes a variety of information representing customer features. When the respective post-processing databases 155 provided from the data processing apparatuses 10 are combined with the hub database H having the single source data as such, reference data to be used for combining may be changed. That is, depending on the types of parameters representing the features of customers included in the post-processing databases 155, the reference data used for combining the post-processing databases 155 and the hub database H may be changed.

For example, if the post-processing databases 155 are provided with feature data having a parameter representing customer contact behavior with network contents, common parameters between the hub database H and the post-processing databases 155 include the parameter representing customer contact behavior with network contents, in addition to or instead of the parameters representing demographic attributes of the customers.

In this case, the hub database H and the post-processing databases 155 may be combined so as to combine the feature data similar in customer contact behavior with network contents represented by the common parameter.

Third Embodiment

The information-processing system 1 of the third embodiment comprises a plurality of data processing apparatuses 10 and the data combining apparatus 50. The data processing apparatuses 10 and the data combining apparatus 50 have the same hardware configuration as those of the first embodiment and the second embodiment. In the following, descriptions of configurations and processing contents in the information-processing system 1 of the third embodiment similar to those of the first embodiment and the second embodiment will be omitted.

Figure 9A:
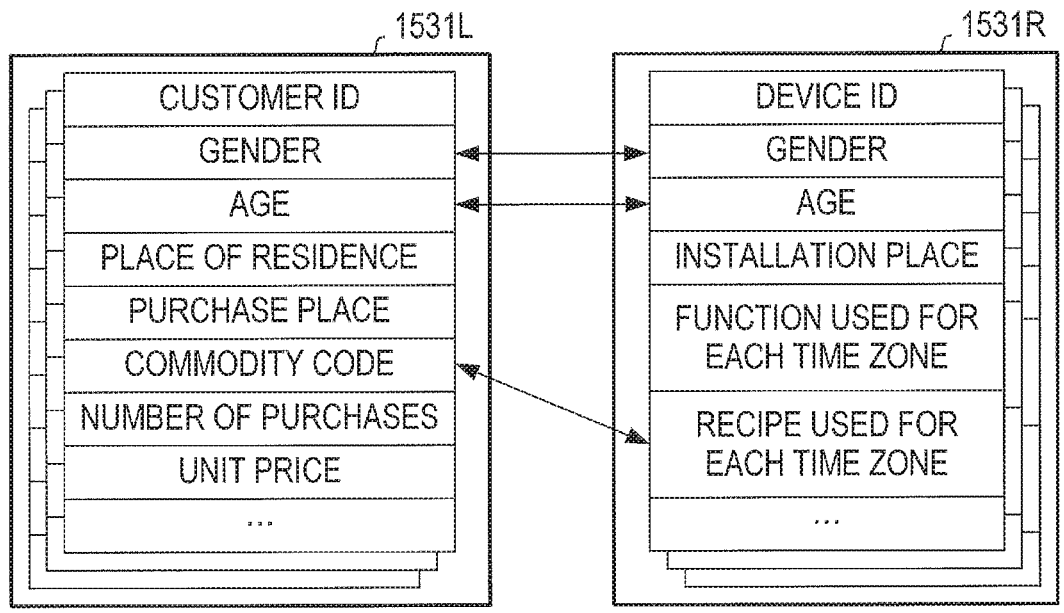
FIG. 9A is a diagram illustrating a structure of customer-related databases in a third embodiment.

The information-processing system 1 of this embodiment has customer-related databases 1531L, 1531R shown in FIG. 9A, as the customer-related databases 153. In the left area of FIG. 9A, an example is shown of the customer-related database 1531L having purchase data of customers acquired from a POS system, as feature data on customers. In the right area of FIG. 9A, an example is shown of the customer-related database 1531R having feature data representing usage of devices used by the customers, as feature data on customers. Examples of the devices include a microwave oven.

According to FIG. 9A, the customer-related database 1531L includes feature data of each settlement. The feature data has parameters that represent the customer's gender, age, and place of residence, as demographic attributes of the customers. Further, the feature data has parameters that represent purchase place of goods purchased by the customers, commodity code, number of purchases, and unit price. Commodity code includes, for example, the JAN code.

According to FIG. 9A, the customer-related database 1531R includes feature data of each microwave oven. The feature data has parameters representing gender and age of the customers who own a microwave oven, as well as parameters representing installation place of the microwave oven, and function and recipe used in the microwave oven of each time zone.

The data processing apparatus 10 having the customer-related database 1531L is configured to cluster a plurality of feature data similar, for example, in gender, age and purchase history in the customer-related database 1531L. The data processing apparatus 10, similar to that of the first embodiment, is configured to statistically processes the plurality of feature data belonging to the same cluster for each cluster, thereby generating feature data of a virtual customer in which the plurality of feature data belonging to the same cluster are integrated for each cluster.

In this way, the data processing apparatus 10 generates the post-processing database 155 including feature data for each virtual customer corresponding to the customer-related database 1531L. The feature data of the post-processing database 155 corresponding to the customer-related database 1531L basically has the same parameters as those of the feature data of the customer-related database 1531L. However, the feature data of the post-processing database 155 shows statistics of the corresponding cluster, as parameter values. The customer ID may be removed at the time of processing.

As another example, the data processing apparatus 10 may be configured to collect feature data of settlement units held by the customer-related database 1531L for each feature data indicating the same customer ID, and then convert the collected feature data to feature data of individual units. In addition, the data processing apparatus 10 may be configured to cluster and statistically process a plurality of feature data similar in purchase history, based on a set of feature data of individual units, thereby generating the post-processing database 155 corresponding to the customer-related database 1531L.

Another data processing apparatus 10 having the customer-related database 1531R is configured to cluster a plurality of feature data similar, for example, in gender, age, and function and usage of recipes, in the customer-related database 1531R. Furthermore, the data processing apparatus 10 is configured to statistically process a plurality of feature data belonging to the same cluster for each cluster, so as to generate feature data of a virtual device in which the plurality of feature data belonging to the same cluster are integrated for each cluster. The data processing apparatus 10 generates the post-processing database 155 provided with the feature data of each virtual device that corresponds to the customer-related database 1531R.

The data combining apparatus 50 is configured to generate the combined database 557 by combining the post-processing database 155 that corresponds to the customer-related database 1531R and the post-processing database 155 corresponding to the customer-related database 1531L.

The data combining apparatus 50 may combine the post-processing databases 155 to be combined, using the parameters representing gender and age of customers and parameters relating to food held in common by the post-processing databases 155 as reference data, so as to combine the feature data similar in feature represented by the reference data among the post-processing databases 155 to be combined.

In the post-processing database 155 that corresponds to the customer-related database 1531L, the "parameters relating to food" correspond to parameters that represent commodity code and number of purchases held by the feature data. In the post-processing database 155 that corresponds to the customer-related database 1531R, the "parameters relating to food" correspond to used recipes.

According to the combined database 557 generated as such, correspondence relationship among gender, age, purchased foodstuff, and recipe can be analyzed. Therefore, through a microwave oven, recommended recipes utilizing the food that a user often purchases may be introduced to the user. Further, food coupons related to frequently used recipes may be added to a receipt output from a POS register.

In the above, as a third embodiment, an example of clustering and statistically processing both the customer-related databases 1531L, 1531R for each feature data similar in feature has been described. However, one of the customer-related databases 1531L, 1531R may not be statistically processed.

That is, the combined database 557 may be generated by combining the post-processing database 155 of the customer-related database 1531L, and the customer-related database 1531R, or may be generated by combining the customer-related database 1531L, and the post-processing database 155 of the customer-related database 1531R. The former combined database 557, for example, can be provided to the data provider of customer-related database 1531R. The latter combined database 557, for example, can be provided to the data provider of customer-related database 1531L.

Fourth Embodiment

The information-processing system 1 of the fourth embodiment, similar to the third embodiment, is basically the system in which only the configuration of the customer-related databases 153 differs from those of the first embodiment and the second embodiment. The data processing apparatus 10 and the data combining apparatus 50 provided in the information-processing system 1 of the present embodiment have the same hardware configuration as those of the first embodiment and the second embodiment.

In the following, descriptions of configurations and processing contents in the information-processing system 1 of the fourth embodiment similar to those of the first embodiment and the second embodiment will be omitted. Hardware configurations and processing contents of the information-processing system 1 of the fifth to eighth embodiments to be subsequently described are also basically the same as those of the first embodiment and the second embodiment.

Figure 9B:
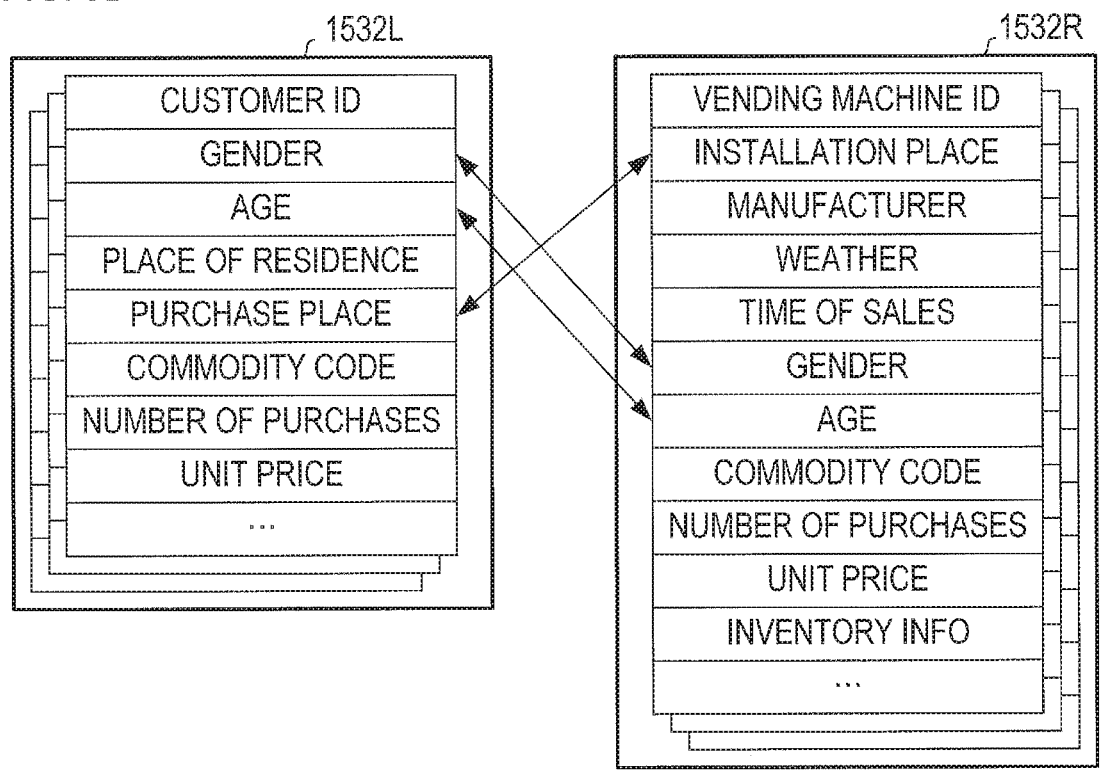
FIG. 9B is a diagram illustrating a structure of customer-related databases in a fourth embodiment.

The information-processing system 1 of this embodiment has a customer-related database 1532L, 1532R shown in FIG. 9B as the customer-related database 153. In the left area of FIG. 9B, an example is shown of the customer-related database 1532L having purchasing data of customers acquired from a POS system, as feature data on customers. In the right area of FIG. 9B, an example is shown of the customer-related database 1532R having feature data representing usage of vending machines, as feature data on customers.

In recent years, a beverage vending machine provided with a liquid crystal display and a camera is known. The vending machine has a function to determine gender and age of a user of the vending machine, from a captured image of the camera, and, based on the result of this determination, display a recommended beverage through the liquid crystal display. The combined database 557 to be described below helps to determine the recommended beverage to be displayed in a vending machine.

According to FIG. 9B, the customer-related database 1532L is configured in the same manner as to the customer-related databases 1531L of the third embodiment. The customer-related database 1532L includes feature data representing purchase history with respect to beverages.

According to FIG. 9B, the customer-related database 1532R includes feature data of each beverage sale in each vending machine. Each feature data that make up the customer-related database 1532R represents installation place and manufacturer of a vending machine. In addition, the feature data represents gender and age as the demographic attribute of a purchaser, as well as weather and time at the time of the corresponding beverage sale. In addition, the feature data represents commodity code, number of purchases, and unit price of beverages purchased by the purchaser. Furthermore, the feature data represents inventory information at the time of the sale. The installation place of a vending machine, for example, is represented by latitude and longitude of a place where the vending machine is installed.

The data processing apparatus 10 having the customer-related database 1532L, for example, is configured to cluster a plurality of feature data similar in gender, age and purchase history in the customer-related database 1532L, and, as in the third embodiment, generate the post-processing database 155 corresponding to the customer-related database 1532L.

The data processing apparatus 10 having the customer-related database 1532R, for example, is configured to cluster a plurality of feature data similar in installation place, manufacturer and inventory information, and the like in the customer-related database 1532R, and then, for each cluster, statistically process a plurality of feature data belonging to the same cluster, thereby generating feature data of a virtual device (vending machine) in which the plurality of feature data belonging to the same cluster are integrated for each cluster.

In this way, the data processing apparatus 10 is configured to generate the post-processing database 155 including feature data for each virtual device, that corresponds to the customer-related database 1532R.

The data combining apparatus 50 is configured to generate the combined database 557 by combining the post-processing database 155 that corresponds to the customer-related database 1532L and the post-processing database 155 that corresponds to the customer-related database 1532R.

For example, the data combining apparatus 50 uses parameters representing gender and age of customers as well as a parameter relating to place as reference data to combine the post-processing databases 155 to be combined so as to combine the feature data similar in feature represented by reference data between the post-processing databases 155 to be combined.

The "parameter relating to place" as used herein corresponds to a parameter representing purchase place held by the feature data in the post-processing database 155 that corresponds to the customer-related database 1532L. In the post-processing database 155 that corresponds to the customer-related database 1532R, the "parameter relating to place" corresponds to a parameter representing the place of the vending machine.

According to the combined database 557 generated as such, for example, correspondence relationship between purchasing behavior of consumers in stores such as convenience stores or supermarkets and purchasing behavior of consumers at vending machines can be analyzed. Therefore, based on this combined database 557, at a vending machine, a beverage purchased well in stores in that region by purchasers similar in age and gender of a user standing in front of the vending machine may be recommended to the user. In a store, a coupon of beverage purchased well at vending machines in that region by users similar in age and gender of a purchaser may be added to a receipt output from a POS register.

Similar to the third embodiment, one of the customer-related database 1532L and the customer-related database 1532R may not be statistically processed. In other words, the combined database 557 may be one that combines the post-processing database 155 of the customer-related database 1532L, and the customer-related database 1532R, or may be one that combines the customer-related database 1532L, and the post-processing database 155 of the customer-related database 1532R. This technical idea is also applicable to the fifth to eighth embodiments described below.

Fifth Embodiment

In the following, descriptions of configurations and processing contents in the information-processing system 1 of the fifth embodiment similar to those of the first embodiment and the second embodiment will be omitted. The information-processing system 1 of this embodiment has customer-related databases 1533L, 1533R shown in FIG. 10A, as the customer-related databases 153.

Figure 10A:
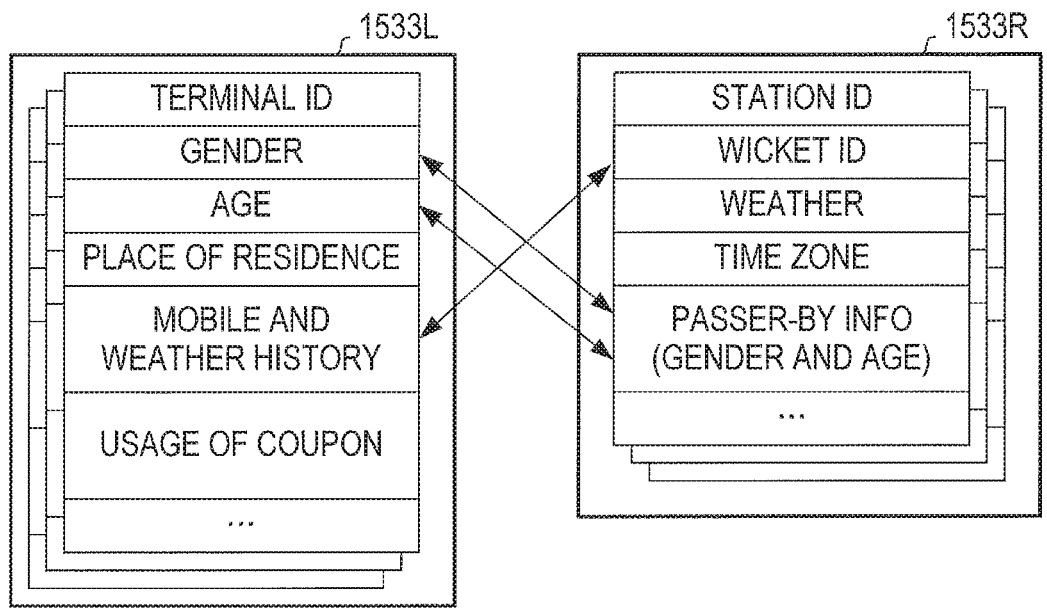
FIG. 10A is a diagram illustrating a structure of customer-related databases in a fifth embodiment.

In the left area of FIG. 10A, an example is shown of the customer-related database 1533L having feature data representing features of each user who owns a mobile terminal typified by a smart phone, as feature data on customers. In the right area of FIG. 10A, an example is shown of the customer-related database 1533R having feature data representing usage of station, as feature data on customers.

According to FIG. 10A, the customer-related database 1533L has feature data for each mobile terminal. The feature data represents gender, age and place of residence as demographic attributes of a user who owns a mobile terminal. In addition, the feature data represents mobile history of the user, and weather of each mobile point. Further, the feature data represents usage of coupon that has been utilized by the user through an application program installed in the mobile terminal.

The customer-related database 1533R has feature data for each combination of station, wicket, weather, and time zone. The feature data that make up the customer-related database 1533R represents gender and age of a passer-by of a wicket, and, passing time zone and weather at the time of passing, as traffic data of the corresponding station and wicket. Gender and age of the passer-by can be acquired from information of commuter pass, or from image captured by a camera.

For example, the data processing apparatus 10 having the customer-related database 1533L clusters a plurality of feature data similar in gender, age, moving state and coupon usage in the customer-related database 1533L. Then, for each cluster, a plurality of feature data belonging to the same cluster is statistically processed to generate feature data of a virtual mobile terminal in which the plurality of feature data belonging to the same cluster are integrated. In this way, the data processing apparatus 10 generates the post-processing database 155 including the feature data of each virtual mobile terminal, that corresponds to the customer-related database 1533L.

The data processing apparatus 10 having the customer-related database 1533R clusters a plurality of feature data similar in feature, in the customer-related database 1533R. The plurality of feature data is statistically processed for each cluster to generate the post-processing database 155 including feature data of each virtual combination of station, wicket, weather and time zone.

The data combining apparatus 50 is configured to generate the combined database 557 by combining the post-processing database 155 corresponding to the customer-related database 1533L and the post-processing database 155 corresponding to the customer-related database 1533R.

For example, the data combining apparatus 50 uses parameters representing gender and age held in common by the post-processing databases 155, as well as parameters relating to place and weather as reference data, to combine the post-processing databases 155 to be combined so as to combine feature data similar in feature represented by the reference data between the post-processing databases 155 to be combined.

According to the combined database 557 generated as such, for example, a correspondence relationship between consumer behavior and coupon usage near a station and trends of passers-by in the station and wicket can be analyzed. Therefore, based on the combined database 557, coupons for the purpose of promoting use of stores near the station may be properly delivered to mobile terminals of users who have passed through the wicket.

Sixth Embodiment

In the following, descriptions of configurations and processing contents in the information-processing system 1 in the sixth embodiment similar to those of the first embodiment and the second embodiment will be omitted. The information-processing system 1 of this embodiment has customer-related databases 1534L, 1534R shown in FIG. 10B, as the customer-related databases 153.

Figure 10B:
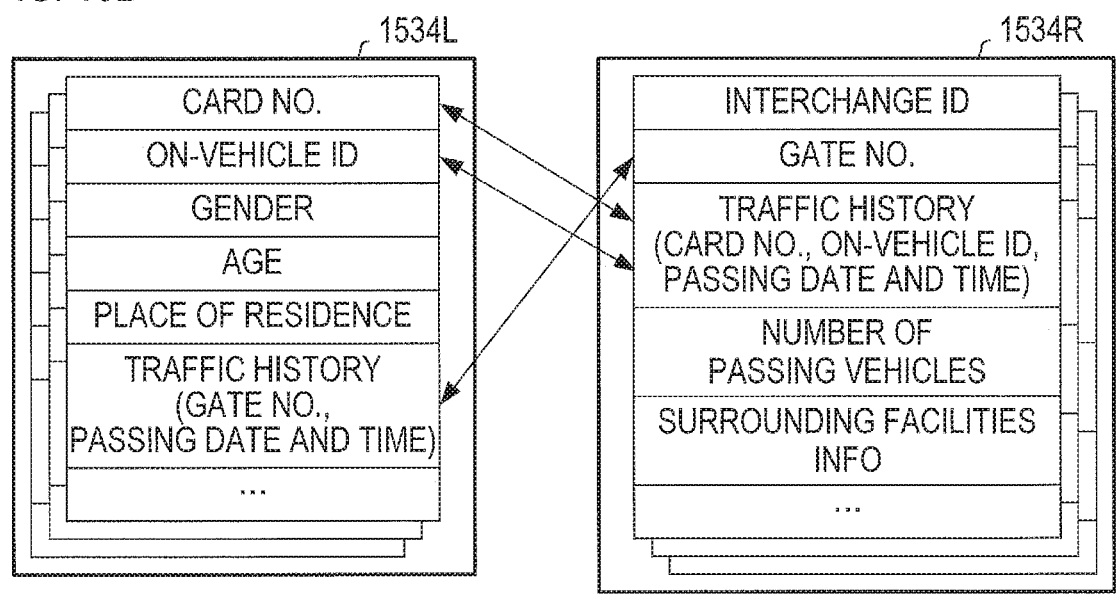
FIG. 10B is a diagram illustrating a structure of customer-related databases in a sixth embodiment.

In the left area of FIG. 10B, an example is shown of the customer-related database 1534L including feature data on customers who own ETC cards. ETC cards are credit cards for an electronic toll collection (ETC) system in toll road networks, which are popular in Japan. In the right area of FIG. 10B, an example shows of the customer-related database 1534R including feature data of each combination of an interchange and a toll gate, as feature data on customers.

The customer-related database 1534L includes feature data for each ETC card. The feature data represents an ID of an on-vehicle device that is associated with the ETC card. In addition, the feature data represents gender, age and place of residence of a customer who owns the ETC card. Furthermore, the feature data represents IDs of toll gates and passing dates and times of the toll gates.

The feature data that make up the customer-related database 1534R represents ETC card number of a vehicle passing the corresponding toll gate of the corresponding interchange, on-vehicle device ID, and passing date and time. In addition, the feature data includes information on number of passing vehicles and surrounding facilities.

For example, the data processing apparatus 10 having the customer-related database 1534L clusters a plurality of feature data similar in gender, age and moving state in the customer-related database 1534L. Then, for each cluster, a plurality of feature data belonging to the same cluster is statistically processed to generate feature data of each virtual customer (card) in which the plurality of feature data belonging to the same cluster are integrated. In this way, the data processing apparatus 10 generates the post-processing database 155 including the feature data of each virtual customer (card), that corresponds to the customer-related database 1534L.

The data processing apparatus 10 having the customer-related database 1534R clusters a plurality of feature data similar in feature, in the customer-related database 1534R. The plurality of feature data is statistically processed for each cluster to generate the post-processing database 155 including feature data of each virtual toll gate.

The data combining apparatus 50 is configured to generate the combined database 557 by combining the post-processing database 155 corresponding to the customer-related database 1534L and the post-processing database 155 corresponding to the customer-related database 1534R.

Based on the combining database 557 generated as such, coupons for the purpose of promoting use of facilities near toll gates may be appropriately distributed to customers through on-vehicle devices such as car navigation systems or credit card companies.

Seventh Embodiment

In the following, descriptions of configurations and processing contents in the information-processing system 1 in the seventh embodiment similar to those in the first embodiment and the second embodiment will be omitted. The information-processing system 1 of this embodiment has customer-related databases 1535L, 1535R shown in FIG. 11A, as the customer-related database 153.

Figure 11A:
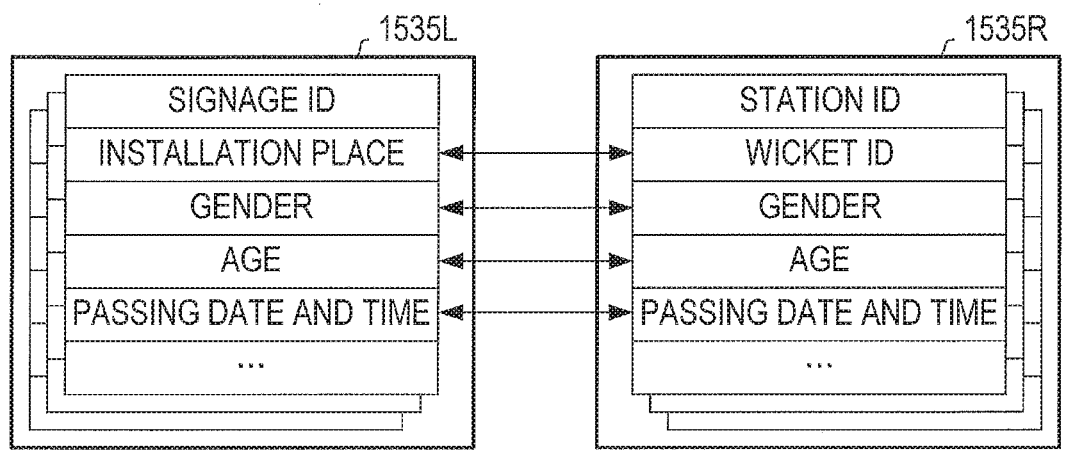
FIG. 11A is a diagram illustrating a structure of customer-related databases in a seventh embodiment.

In the left area of FIG. 11A, an example is shown of the customer-related database 1535L including feature data of each passer-by who passes the front of digital signage for each digital signage, as feature data on customers. In the right area of FIG. 11A, an example is shown of the customer-related database 1535R including feature data of each passer-by who passes wickets for each wicket of stations, as feature data on customers.

According to FIG. 11A, the feature data of the customer-related databases 1535L represents the place of digital signage. Further, the feature data represents gender, age and passing date and time of a passer-by. Gender and age of the passer-by may be determined from an image taken by a camera installed on the digital signage or in the vicinity thereof. The feature data may further represent number of passers-by for each time zone near the digital signage, number of viewers of the digital signage for each time zone, and data representing advertiser information for each time zone.

Feature data of each passer-by in the customer-related database 1535R represents gender, age and passing date and time of a passer-by, as well as an ID of a passing wicket and an ID of the station that has the wicket.

The data processing apparatus 10 having the customer-related database 1535L clusters a plurality of feature data similar in passer-by feature, for example, in the customer-related database 1535L. Then, for each cluster, a plurality of feature data belonging to the same cluster is statistically processed to generate the feature data of a virtual passer-by in which the plurality of feature data belonging to the same cluster are integrated for each cluster. In this way, the data processing apparatus 10 generates the post-processing database 155 including the feature data of each virtual passer-by, that corresponds to the customer-related database 1535L.

For example, the data processing apparatus 10 having the customer-related database 1535R clusters a plurality of feature data similar in passer-by feature in the customer-related database 1535R. The feature data is statistically processed for each cluster to generate the post-processing database 155 including the feature data of each virtual passer-by.

The data combining apparatus 50 is configured to generate the combined database 557 by combining the post-processing database 155 that corresponds to the customer-related database 1535L and the post-processing database 155 that corresponds to the customer-related database 1535R.

For example, the data combining apparatus 50 uses parameters representing gender and age of passers-by held in common by the post-processing databases 155, as well as a parameter relating to place as reference data, to combine the post-processing databases 155 to be combined so as to combine the feature data similar in feature represented by the reference data between the post-processing databases 155 to be combined.

In the post-processing database 155 that corresponds to the customer-related database 1535L, the "parameter relating to place" corresponds to a parameter that represents place of digital signage of the feature data. In the post-processing database 155 that corresponds to the customer-related database 1535R, the "parameter relating to place" corresponds to the parameters representing station and wicket.

According to the combined database 557 generated as such, for example, correspondence relationship between passers-by through a wicket and passers-by before digital signage may be analyzed. Therefore, in accordance with change of passers-by of the wicket, advertisement to be displayed on the digital signage may be appropriately switched.

Eighth Embodiment

In the following, descriptions of configurations and processing contents in the information-processing system 1 of the eighth embodiment similar to those of the first embodiment and the second embodiment will be omitted. The information-processing system 1 of this embodiment has customer-related databases 1536L, 1536R shown in FIG. 11B, as the customer-related database 153.

Figure 11B:
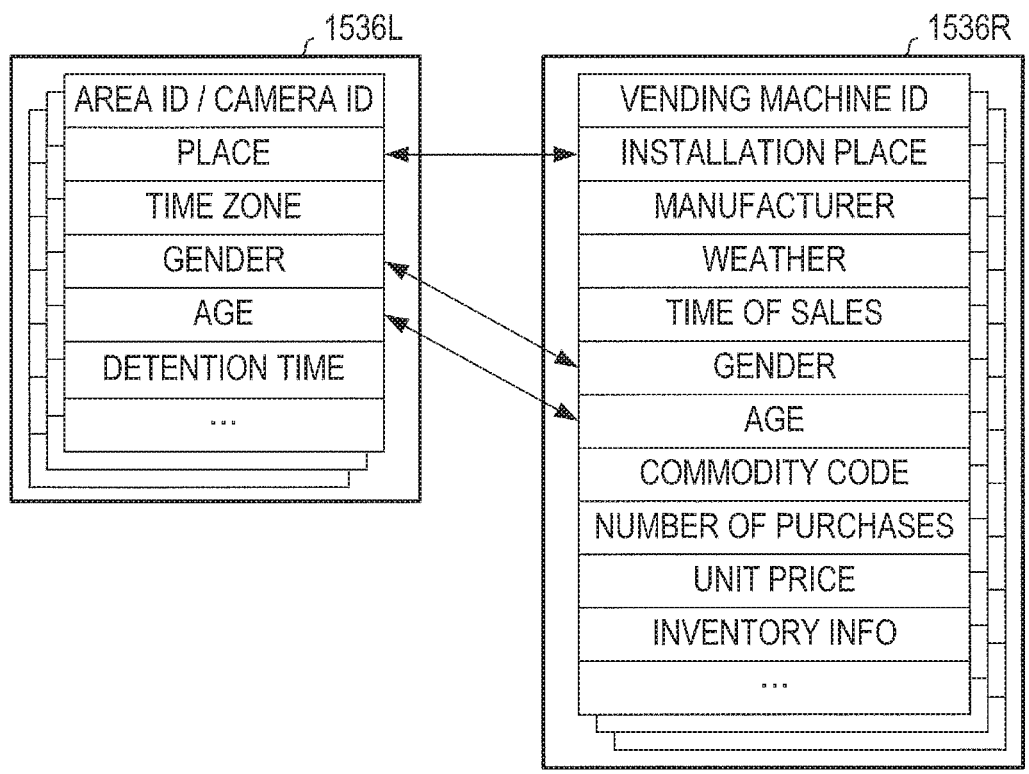
FIG. 11B is a diagram illustrating a structure of customer-related databases in an eighth embodiment.

In the left area of FIG. 11B, an example is shown of the customer-related database 1536L including feature data of each passer-by in a surveillance area captured by a camera, as feature data on customers. In the right area of FIG. 11B, an example is shown of the customer-related database 1536R including feature data representing usage of each beverage vending machine, as feature data on customers.

According to FIG. 11B, the feature data of the customer-related database 1536L represents place (surveillance area) where a passer-by is captured and time zone. In addition, the feature data represents gender and age of the passer-by. Additionally, the feature data may represent detention time or passing time of the passer-by.

The customer-related database 1536R includes feature data of each beverage sale in each vending machine. The feature data that make up the customer-related database 1536R are configured in the same manner as in the feature data of the customer-related database 1532R in the fourth embodiment.

The data processing apparatus 10 having the customer-related database 1536L clusters a plurality of feature data similar in passer-by feature, in the customer-related database 1536L. Then, for each cluster, a plurality of feature data belonging to the same cluster are statistically processed to generate feature data of a virtual passer-by in which the plurality of feature data belonging to the same cluster are integrated for each cluster. In this way, the data processing apparatus 10 generates the post-processing database 155 including the feature data of each virtual passer-by, that corresponds to the customer-related databases 1536L.

The data processing apparatus 10 having the customer-related database 1536R clusters a plurality of feature data for each plurality of feature data similar in purchaser feature, in the customer-related database 1536R, thereby generating the post-processing database 155 including feature data of each virtual purchaser.

The data combining apparatus 50 is configured to generate the combined database 557 by combining the post-processing database 155 that corresponds to the customer-related database 1536L and the post-processing database 155 that corresponds to the customer-related database 1536R.

For example, the data combining apparatus 50 uses parameters representing gender and age held in common by the post-processing databases 155, as well as a parameter relating to place as reference data, to combine the post-processing databases 155 to be combined so as to combine the feature data similar in the feature represented by the reference data between the post-processing databases 155 to be combined. In the post-processing database 155 that corresponds to the customer-related database 1536L, the "parameter relating to place" corresponds to a parameter that is held by the feature data and represents place where a passer-by has been captured. In the post-processing database 155 that corresponds to the customer-related database 1536R, the "parameter relating to place" corresponds to a parameter representing place of a vending machine.

According to the combined database 557 generated as such, for example, correspondence relationship between distribution and detention time of passers-by and purchasing behavior at vending machines can be analyzed. Results of this analysis may help inventory management of vending machines, assortment, and display of recommendation.

Others

The present disclosure is not to be limited to the embodiments described above, and may take various embodiments. For example, in the above embodiments, an example has been described that customer groups between the databases to be combined (the post-processing databases 155 or the customer-related databases 153) are not consistent. However, techniques of this disclosure may be used to combine databases representing different types of features for the same customer groups. For example, the techniques of this disclosure may be used to combine purchase data at convenience stores and purchase data at supermarkets for the same customer groups. Any embodiments included in the technical idea specified from the language of the claims are embodiments of the present disclosure.

Finally, correlation between terms will be described. The calculation unit 11 (in particular, the clustering unit 110 and the processing unit 115) provided in the data processing apparatus 10 corresponds to an example of a generation unit. The calculation unit 51 (in particular, the data fusion processing unit 510) provided in the data combining apparatus 50 corresponds to an example of a combining unit. The storage unit 55 provided in the data combining apparatus 50 corresponds to an example of a storage unit. The set of feature data that make up the database (the customer-related database 153/the post-processing database 155) or the set of persons, objects (for example, mobile terminals/vending machines/ovens/cards), or places (for example, wickets/toll gates) correspond to an example of a group. Elements of the set correspond to an example of a constituent.

The invention claimed is:

1. An information-processing system comprising:
a storage unit configured to store a first database and a second database; and
a combining unit configured to combine the first database and the second database stored in the storage unit; and
a generation unit configured to generate the first database,
the first database being a database including feature data of each virtual constituent to be generated, by the generation unit, by integrating feature data of a plurality of constituents identical or similar in feature by statistical processing based on feature data of each constituent of a first group,
the second database being a database including feature data of each virtual constituent generated by integrating feature data of a plurality of constituents identical or similar in feature by statistical processing based on feature data of each constituent of a second group,
each of the feature data of the first and second databases including reference data to be referred to upon the combining, the reference data representing a common type of feature between the first database and the second database,
the reference data being generated by the statistical processing,
the reference data indicating various types of statistics relating to features of a corresponding virtual constituent, the various types of statistics including at least two types of statistics selected from an average value, a median, a ratio, a maximum value, a minimum value, and a variance,
the combining unit combining the first database and the second database so as to combine the feature data identical or similar in feature represented by the reference data between the first database and the second database.

2. The information-processing system according to claim 1,
wherein the generation unit clusters a set of the feature data relating to the first group into each plurality of feature data identical or similar in feature, and statistically processes for each cluster the plurality of feature data corresponding to the cluster to calculate a statistic for each parameter of the plurality of feature data, thereby generating feature data for each of the virtual constituents corresponding to each of the clusters including the statistic as a parameter value representing the feature.

3. The information-processing system according to claim 1, comprising
the generation unit as a first generation unit, and
a second generation unit configured to generate the second database based on feature data of each constituent of the second group.

4. A non-transitory computer readable recording medium in which a computer program for causing a computer to function as a combining unit in an information-processing system according to claim 1 is recorded.

5. The information-processing system according to claim 1, wherein the second group is different from the first group.

6. The information-processing system according to claim 1,
wherein the various types of statistics include at least one of combination of the average value and the variance, or combination of the maximum value and the minimum value.

7. The information-processing system according to claim 1,
wherein the feature data of each virtual constituent include information on a number of samples corresponding to a number of integrated feature data, and
wherein the combining unit combines a first feature data with a second feature data with a weight according to a number of samples of the second feature data.

8. An information-processing system comprising:
a storage unit configured to store a plurality of databases;
a plurality of generation units for respective databases configured to generate the plurality of databases; and
a combining unit configured to combine the plurality of databases stored in the storage unit,
each of the databases being a database for one of a plurality of groups, the database including feature data of each virtual constituent of the corresponding group generated by integrating feature data of a plurality of constituents identical or similar in feature by statistical processing, based on feature data of each constituent of the corresponding group,
each of the feature data of the plurality of databases including reference data to be referred to upon combining the databases, the reference data representing a common type of feature to that of the database to be combined,
the reference data being generated by the statistical processing,
the reference data indicating various types of statistics relating to features of a corresponding virtual constituent, the various types of statistics including combination of a first type of statistics and a second type of statistics indicating distribution relating to the features of the corresponding virtual constituent,
the combining unit combining the plurality of databases so as to combine the feature data identical or similar in feature represented by the reference data among the plurality of databases.

9. The information-processing system according to claim 8,
wherein each of the generation units clusters a set of the feature data related to the corresponding group into each plurality of feature data identical or similar in the feature, and statistically processes for each cluster the plurality of feature data corresponding to the cluster to calculate a statistic for each parameter of the plurality of feature data, thereby generating feature data of each of the virtual constituents corresponding to each of the clusters including the statistic as a parameter value representing the feature.

10. The information-processing system according to claim 8,
wherein the combining unit is configured to combine the plurality of databases via a specific type of database, the specific type of database including single source data as feature data for each constituent of a group that is the same group as or a different group from one of the plurality of groups corresponding to the plurality of databases,
the single source data including reference data to be referred to upon combining the databases, the reference data representing a common type of feature to that of the database to be combined, the combining unit combines the specific type of database and each of the other databases so as to combine the feature data identical or similar in feature represented by the reference data, thereby combining the plurality of databases via the specific type of database.

11. The information-processing system according to claim 8,
wherein the combination includes at least one of combination of an average value and statistics indicating spread of the distribution.

12. The information-processing system according to claim 8,
wherein the combination includes at least one of combination of an average value and a variance, or combination of a maximum value and a minimum value.

13. The information-processing system according to claim 8,
wherein the feature data of each virtual constituent include information on a number of samples corresponding to a number of integrated feature data, and
wherein the combining unit combines a first feature data with a second feature data with a weight according to a number of samples of the second feature data.

14. A database combining method comprising:
generating a first database including feature data of each virtual constituent generated by integrating feature data of a plurality of constituents identical or similar in feature by statistically processing based on feature data of each constituent of a first group;
generating or acquiring a second database including feature data of each virtual constituent generated by integrating feature data of a plurality of constituents identical or similar in feature by statistical processing based on feature data for each constituent in a second group; and
combining the first database with the second database,
each of the feature data of the first and the second databases including reference data to be referred to upon combining, the reference data representing a common type of feature between the first database and the second database,
the reference data being generated by the statistical processing,
the reference data indicating various types of statistics relating to features of a corresponding virtual constituent, the various types of statistics including at least two types of statistics selected from an average value, a median, a ratio, a maximum value, a minimum value, and a variance,
wherein combining comprises combining the first database and the second database, so as to combine the feature data identical or similar in feature represented by the reference data between the first database and the second database.

15. The database combining method according to claim 14,
wherein the second group is different from the first group.

16. A computer readable non-transitory recording medium recording a computer program including instructions to cause, when the computer program is executed by a computer, the computer to implement the database combining method according to claim 14.

17. The database combining method according to claim 14,
wherein the various types of statistics include at least one of combination of the average value and the variance, or combination of the maximum value and the minimum value.

18. The database combining method according to claim 14,
wherein the feature data of each virtual constituent include information on a number of samples corresponding to a number of integrated feature data, and
wherein the combining unit combines a first feature data with a second feature data with a weight according to a number of samples of the second feature data.

* * * * *